United States Patent
Rochford et al.

(10) Patent No.: US 6,487,604 B1
(45) Date of Patent: Nov. 26, 2002

(54) ROUTE MONITORING GRAPHICAL USER INTERFACE, SYSTEM AND METHOD

(75) Inventors: Suzanne L. Rochford, Hull (CA); Larry A. Franko, Stittsville (CA); Allan Wille, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/345,472

(22) Filed: Jun. 30, 1999

(51) Int. Cl.$^7$ .............................................. G06F 13/00
(52) U.S. Cl. ........................ 709/238; 709/220; 709/224; 709/242
(58) Field of Search ................................. 709/220, 223, 709/224, 238, 242, 249

(56) References Cited

U.S. PATENT DOCUMENTS

| | | | |
|---|---|---|---|
| 5,202,985 A | 4/1993 | Goyal | 395/600 |
| 5,751,964 A | 5/1998 | Ordanic et al. | 395/200.54 |
| 5,801,707 A | 9/1998 | Rolnik et al. | 345/429 |
| 5,910,803 A * | 6/1999 | Grau et al. | 345/357 |
| 5,926,463 A * | 7/1999 | Ahearn et al. | 370/254 |
| 5,958,012 A * | 9/1999 | Battat et al. | 709/224 |
| 6,040,834 A * | 3/2000 | Jain et al. | 345/356 |
| 6,304,273 B1 * | 10/2001 | Bonnet | 345/440 |

FOREIGN PATENT DOCUMENTS

EP 0849912 6/1998 .......... H04L/12/24

OTHER PUBLICATIONS

Bay Networks, Inc., Apr. 1998, "Using Optivity Netork Management System 8.1 Internetwork Applications", Chapters 3 and 4.

"Telecom Operations Map", Telemanagement Forum, Evaluation Version 1.1, Apr. 1999, pp. iii to xxii and 1 to 49.

* cited by examiner

*Primary Examiner*—Viet D. Vu

(57) ABSTRACT

A network management method and system for managing a network in which routes between pairs of end points take different paths is provided. To begin, device level status and performance information is collected from the network and transformed into path and route information. Next, from the path and route information parameters which characterize the state of each of the routes are computed. Next, the parameters of each of the routes are displayed graphically. This allows a user to obtain a quick visual identification of the state of all of the routes in the network individually and in relation to one another. The invention also provides a network management graphical user interface method in which a 3-D representation of three axes is displayed. Each axis pertaining to a respective one of three route parameters. On these three axes, for each route a parameter point representing the routes parameters is displayed as a function of time. An instantaneous direction and rate of change for each parameter is computed. Each parameter point is displayed in the form of a cone having a central axis pointing in the instantaneous direction of the parameter point, and which has a length which is proportional to the rate of change of the corresponding parameter point.

29 Claims, 10 Drawing Sheets

ROUTE MONITORING GRAPHICAL USER INTERFACE, SYSTEM AND METHOD

FIELD OF THE INVENTION

The invention relates to network management and, in particular, to methods and systems for the management of routes in telecommunications networks.

BACKGROUND OF THE INVENTION

In today's large telecommunications networks such as core networks used for Internet service providers (ISPs) or major corporate backbones, network management plays an important role in maintaining network stability, performance and efficiency. Network management is used to perform a variety of functions including the detection and correction of fault conditions, the identification, configuration and monitoring of use of network devices for cost allocation and performance evaluation.

Presently, the vast majority of networks are managed at the physical or device level by a centralized management entity commonly referred to as a network manager server (hereinafter "network manager") whereby devices in the network such as routers and physical layer interfaces are each individually polled by the network manager for status updates. However, in many situations, this process is not time-efficient.

For example, in the event of a congestion point causing unusual traffic delays or a failure causing a traffic interruption along a particular routing path, each network device located along that particular path and involved in the transmission of the traffic delayed or interrupted as a result of the congestion point or failure must be polled by the network manager to locate the source of the problem. Polling multiple devices each time a problem arises along a particular routing path is therefore time-consuming and as a result, substantially lengthens the time necessary to solve the problem.

Because polling of multiple network devices is time-consuming, most problems encountered in a network may deteriorate or improve by the time a network manager is able to track down the root of the problem, making it more difficult to ascertain its true nature. Moreover, in many cases, clients only report network problems long after their occurrence which, by that time, may not be visible problems anymore. This is particularly true of congestion points which are intermittent by their very nature and only occur in heavy traffic conditions.

In ascertaining the nature of a particular problem, it is often necessary for the network manager to determine which clients are affected and the manner in which these clients are affected. This typically requires a network-level analysis of each problem by considering the performance history of the particular routes and paths used by each client. A route is a static concept typically defined by a source endpoint and a destination endpoint in a network. By contrast, a path is a dynamic concept associated with a particular route. A path is defined as the set of network devices and their respective interfaces traversed by traffic travelling in a particular direction at any given point in time on the particular route. Paths in a data network are usually dynamically determined by a router protocol.

However, current device-level management applications do not provide the necessary tools for efficiently monitoring routes and paths. As a result, these problems become virtually impossible to solve and may persist indefinitely. Therefore, there is a need to provide network operators with the ability to monitor the performance history of routes and paths for efficient troubleshooting of problems arising in a network.

Another drawback of the use of device-level management is that it does not address real-time performance issues at a routing path level which often arise in a network as a result of problems occurring at the device level such as congestion points and link or equipment failures. Device-level management only deals with performance issues for which the network devices are individually responsible. However, this "device-level view" does not provide a path-level understanding of the overall real-time performance of all the devices defining a particular path of a particular route.

For example, in correcting a congestion problem, device-level management does not address whether the data transmitted on a particular source-destination route follows the intended path which may have been specifically provisioned for it or whether it has been rerouted to an alternate path.

When traffic is rerouted due to a failure in the network, another real-time performance issue not addressed by device-level management is whether the alternate path chosen has the requisite capacity for accommodating the traffic delayed or interrupted or whether the traffic as redirected will maintain the same level of service it had prior to being redirected. As network routes are currently sold to network clients with a specific quality of service (QoS), adequate configuration and path provisioning of network routes is becoming increasingly important. Therefore, there is a need for providing a network with adequate real-time performance monitoring and path provisioning capability for maintaining performance in a network and meeting ever increasing QoS demands.

The need to deal with device-level problems in a more time-efficient manner and address real-time performance issues arising as a result of the occurrence of device-level problems has triggered the emergence of what is now known in network management as trace routing. Trace routing applications allow some form of network-level management of paths and routes by relying on test messages to perform path discovery of specified routes. In particular, current trace routing implementations determine the path likely to be followed by traffic for a particular source-destination route by sending one or more test packets from the source node to the destination node and summarizing the results. However, this method has a number of disadvantages. First, the trace routing of any given source-destination route can only be performed from the source node. Another disadvantage is that most network devices are not properly instrumented to do this function and do not treat the test packets with the same priority than normal traffic. Therefore, the results obtained with this method are not truly representative of how the network devices handle their respective traffic in real-time. As a result, there has been a need for an improved network management system for managing and monitoring paths and routes in a network and also for monitoring the behaviour of network devices in real-time.

A solution to this problem has recently been proposed in U.S. application Ser. No. 09/288,565 filed Apr. 9, 1999 entitled "Routes and Paths Management" to Mark Robinson and Larry Franko assigned to the same applicant as this application which teaches a method and apparatus whereby information pertaining to the paths traversed in particular routes can be obtained. This application is hereby incorporated by reference in its entirety. The information is collected by polling the individual network elements and performing some manipulation of the data thus obtained to determine the paths taken for a particular route between two points in a network, for example between two IP addresses. This allows path and route level network management to be performed. This has provided a substantial improvement over the state-of-the art discussed above in which device-level management is performed.

Referring now to FIG. 2, a flowchart for a very simplified version of the method taught in the above-identified U.S. patent for the collection of data from a network is displayed. Firstly, the raw data is collected from the network using conventional network management data collection techniques. Next, this data is processed so as to identify paths of selected routes, and then the data is stored as a function of time in association with the identified paths and routes in a database.

While the above referenced application teaches how the route and path information may be collected, this is such a departure from the conventional information made available to network management applications that conventional GUI (graphical user interfaces) are incapable of making an effective use of this information. It would be advantageous to have a GUI which effectively makes use of the improved route and path information in order to allow a user to quickly assess the overall health of the network.

SUMMARY OF THE INVENTION

It is an object of the invention to obviate or mitigate one or more of the above identified disadvantages and shortcomings of current network management applications.

The invention provides a network management method for managing routes in a network, preferably routes between pairs of end points taking multiple different paths. To begin, device level status and performance information is collected from the network and transformed into path and route information, for example using techniques such as taught in the above referenced patent to Robinson et al. Next, from the path and route information parameters which characterize the state of each of the routes are computed. Next, the parameters of each of the routes are displayed graphically. This allows a user to obtain a quick visual identification of the state of all of the routes in the network.

According to another broad aspect, the invention provides a network management graphical user interface method in which a 3-D representation of three axes is displayed, each axis pertaining to a respective one of three route parameters. On these three axes, for each route a parameter point representing the routes parameters is displayed as a function of time.

Preferably, an instantaneous direction for each parameter is computed, and the display of each parameter point is done in a manner from which the instantaneous direction of the parameter point can be visually ascertained. Also preferably, each parameter point may be displayed in a manner indicative of the rate of change of the corresponding parameter point.

Preferably, each parameter point is displayed in the form of a cone having a central axis pointing in the instantaneous direction of the parameter point, and which has a length which is proportional to the rate of change of the corresponding parameter point.

A user can select a particular parameter point upon which further details in relation to the corresponding route are displayed. The further details may for example be the three parameters for the particular route displayed individually.

When a parameter point is selected, preferably a cuboid is displayed which allows the determination of the location of the parameter points. Markers indicating where the particular parameter point's parameters are on each of the three axes may be displayed.

Preferably, the parameter points are displayed in a first colour if all of the parameters are within an acceptable operating range, and are displayed in a second colour if at least one of the parameter points are outside the acceptable operating range. More generally, the parameter points may be displayed with first and second characteristics.

The display displays the parameter points as they exist at a particular point and time. A user may select a particular time for which the parameter points are to be displayed. Furthermore, an animated display for parameters updated between a first and second time may be produced. The advancement of the display between a first time and a second time may be controlled by dragging a selected time indicator between a first time and a second time on a time bar, for example.

In the event that real-time updating is requested, the display may be updated in real-time to reflect a most recent set of parameters.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
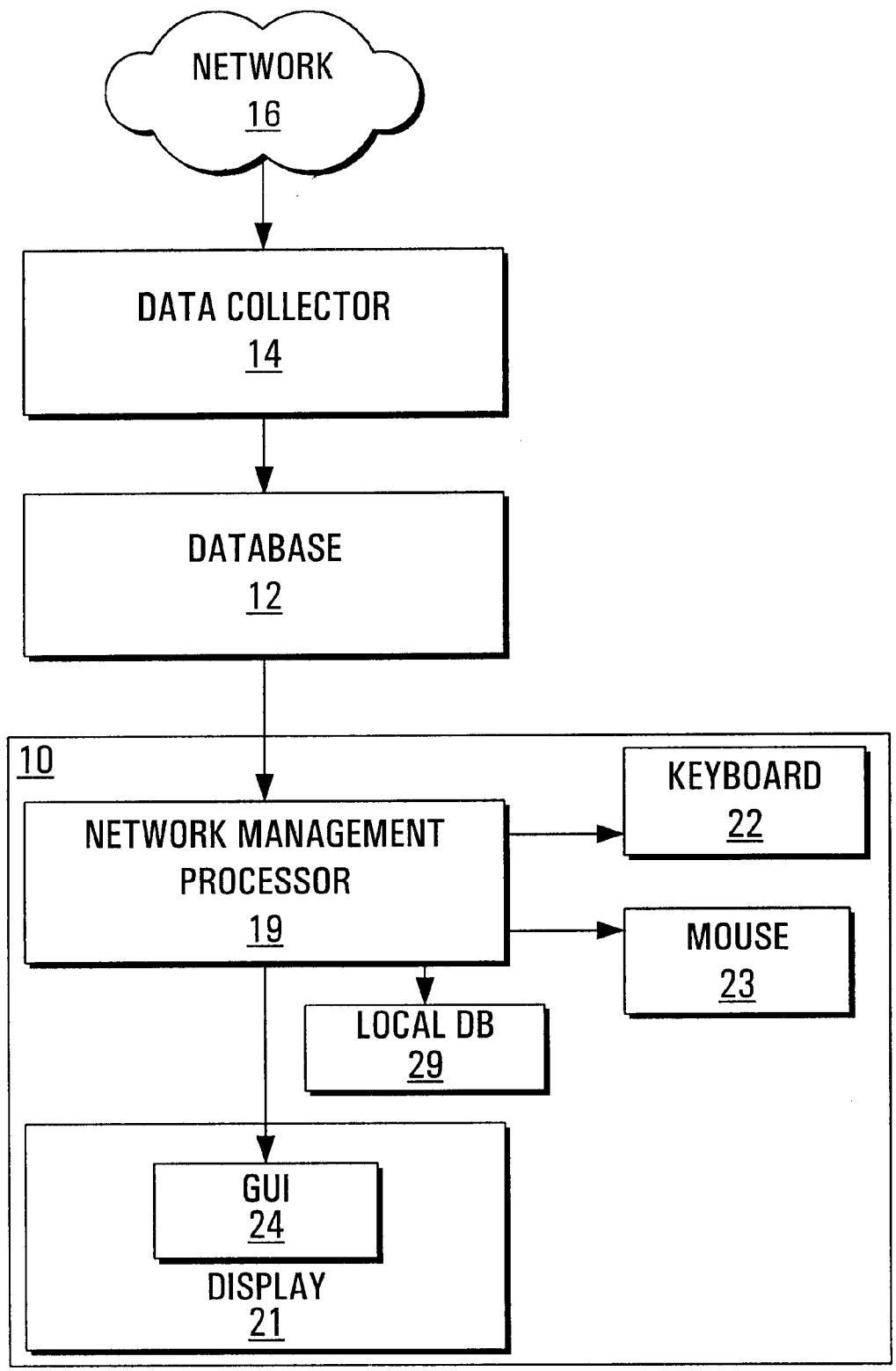
FIG. 1 is a block diagram of a network connected to a network management device featuring a graphical user interface according to an embodiment of the invention.
Figure 2:
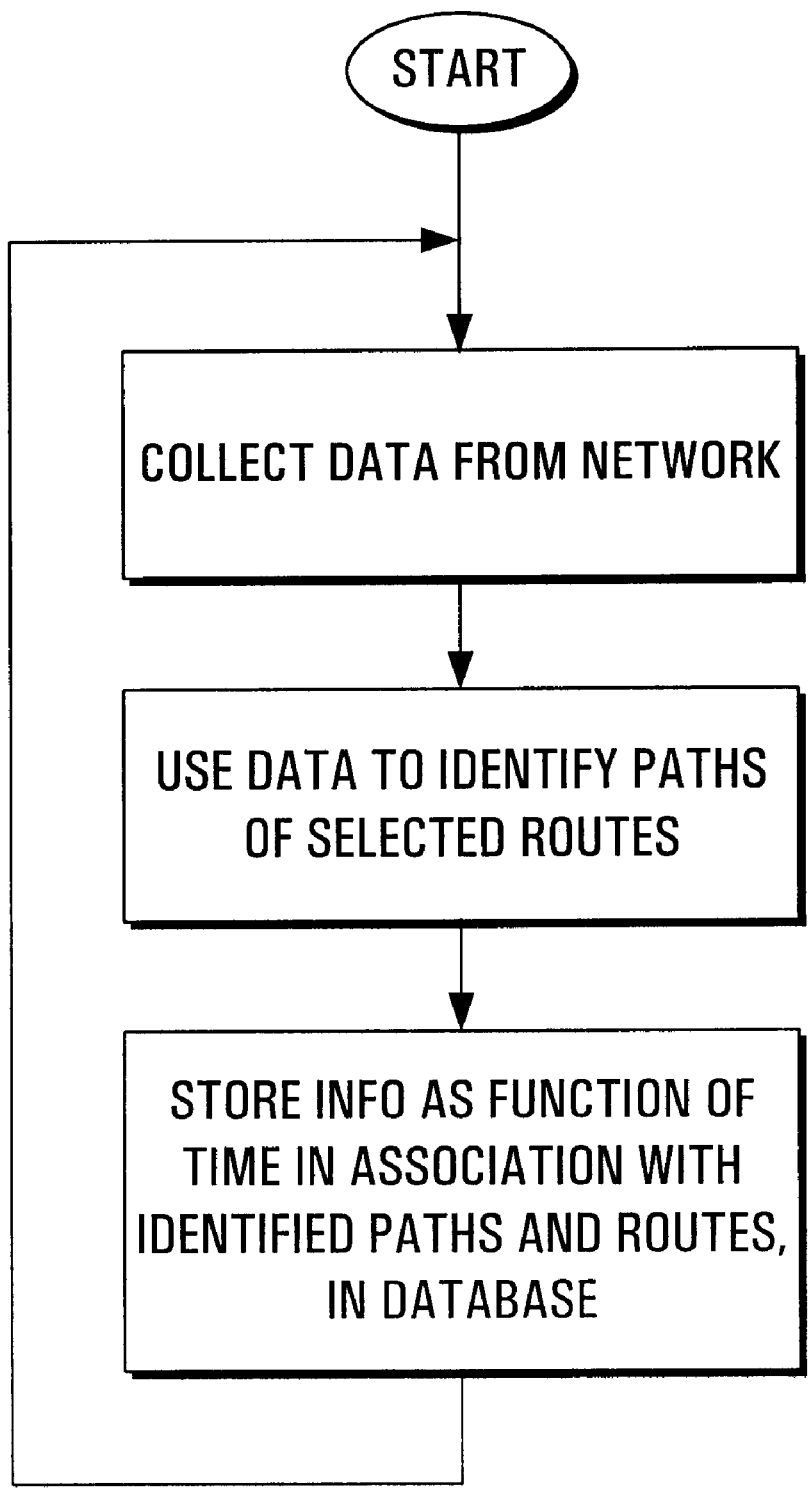
FIG. 2 is a flowchart for how data may be collected from the network of FIG. 1.

Referring now to FIG. 1, a NMD (network management device) 10 is shown connected to a database 12 and a data collector 14 connected to a network 16 which might for example be an IP (Internet protocol) network. The data collector 14 is capable of collecting information from the network 16 for different routes and more particularly for all of the paths which make up different routes. It may for example be the data collector taught in the above referenced U.S. patent application Ser. No. 09/288,565. The NMD 10 has a local database 29 and has a network management processor 19 which is connected to a display 21, and to various user input devices such as a keyboard 22 and a mouse 23. If the display 21 is touch sensitive, then the display itself provides a user input device. The NMD 10 is adapted to perform two functions. Firstly, it presents a GUI 24 on the display 21 to enable the presentation of information to a user in a coherent manner and to enable the receipt of instructions from the user through the user input devices 22,23. Secondly, it performs processing on data stored in the database 12 in accordance with instructions received from users through the GUI 24 to put it into a form suitable for display.

Figure 3:
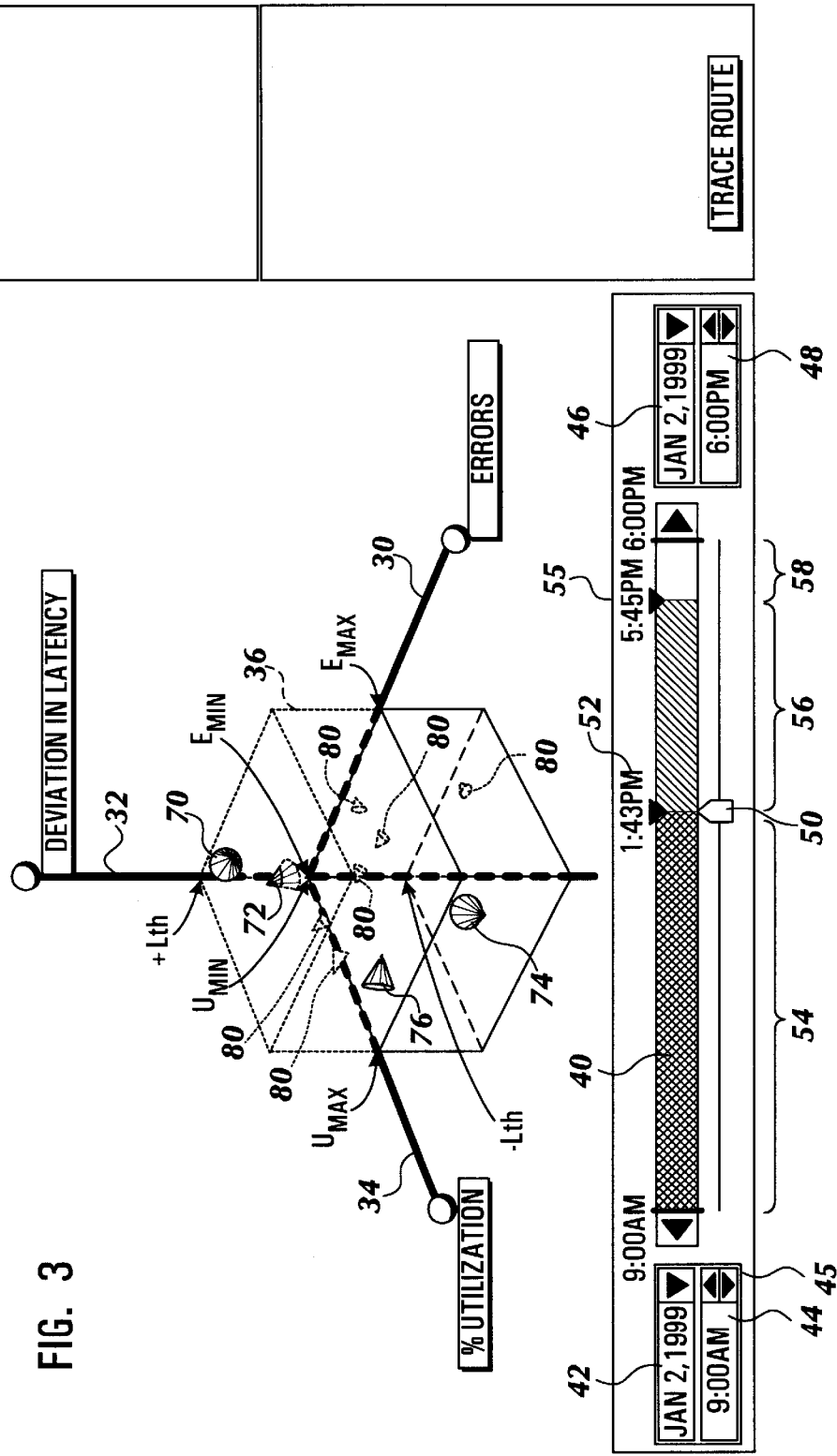
FIG. 3 is an example display produced by a graphical user interface according to an embodiment of the invention.

Referring now to FIG. 3, an example of a GUI according to an embodiment of the invention is depicted. The structure of the display includes three axes 30,32,34 for displaying three different route parameters. In the illustrated example, these are labelled errors, deviation in latency, and % utilization respectively. The axes 30,32,34 are displayed in a manner which makes them look like they are perpendicular to each other. Also shown is a threshold cuboid 36 which has six sides. A respective two of the cuboid's six sides are perpendicular to each axis 30,32,34, and define a normal minimum-maximum working range for the corresponding route parameter. For axis 30 displaying errors, the minimum is $E_{min}=0$ (errors cannot be negative), and the maximum is at $E_{max}$. For axis 32 displaying deviation in latency, the minimum is at $-L_{th}$, and the maximum is at $+L_{th}$. For axis 34 displaying per cent utilization, the minimum is at $U_{min}=0$ (percent utilization cannot be negative), and the maximum is at $U_{max}$.

A mechanism for managing the start time, end time and current time selection is required. While many suitable ways of doing this may be applied, a particular example will be described. A time bar 40 appears at the bottom of the display of the present invention, and consists of a start date selector 42, start time selector 44, end date selector 46, end time selector 48, time slider 50, selected time indicator 52 and current time display 55. The purpose of the time bar 40 is to display the timeframe or dates for which performance data is displayed in the GUI. The start time and date are selected by the user by means of the start date selector 42 which may for example be a pull-down menu, and the start time selector 44. The start time may be selected by typing the time directly into the start time selector 44 window, or by moving the time forward or backward using the up and down arrows 45 associated with the start time selector. The end time and date may be selected by the user in a similar fashion using the end date selector 46 and the end time selector 48.

The time for which any instantaneous data appears (as described below) in the GUI is indicated by the selected time indicator 52. The time slider 50 may be moved along the time bar 40, for example by clicking with a mouse on the time slider and dragging it to the right or left. The selected time indicator 52 moves along with the time slider 50 and is constantly updated to show a corresponding time selected for display.

The current time is indicated by the current time display 55 comprising a current time indicator above a small triangle. Preferably, the current time is substantially equal to an actual network time. Preferably, at all times, the portion 54 of the time bar 40 representing the period between the start date/time selected on the start date indicator 42 and start time indicator 44 and the time indicated by the selected time indicator 52 appears with a first appearance (in a dark shading for example), the portion 56 of the time bar 40 representing the period between the selected time indicator 52 and the current time display 55 appears with a second appearance (in a lighter shading for example), and the portion 58 of the time bar 40 representing the period between the current time display 55 and the end date/time selected on the end date indicator 46 and end time indicator 48 appears with a third appearance (in white for example).

In the example of FIG. 3, the start date is Jan. 2, 1999, the start time is 9:00 AM, the selected time is 1:43 PM, the current time is 5:45 PM, the end date is Jan. 2, 1999 and the end time is 6:00 PM. By selecting an end time/end date in the future and selecting real-time update, the display in sync with the advance of the current time indicator will update itself in real-time. There is no current time display 55 if only archival data is to be viewed, i.e. if the end time/end date has already occurred.

For each route in the network being managed, or alternatively for each route selected from a list of routes, the GUI displays a PDI (position and direction indicator) which in the illustrated example consists of a cone drawn in two dimensions to appear three-dimensional. Each PDI is displayed on the three dimensional set of axes 30,32,34 in a position in accordance with the particular route's parameter point as defined by its errors, deviation in latency and % utilization parameters. The PDIs which represent points within the cuboid 36 are displayed in a first colour, and all the PDIs which represent points outside the cuboid which is orange in the illustrated example are displayed in a second colour which is grey in the illustrated example. Although not shown, preferably the cuboid 36 is drawn to have a translucent appearance such that PDIs and portions of PDIs which are inside the cuboid appear partially obscured. In the illustrated example, PDIs 70,72,74,76 are outside or partially outside the cuboid 36, while the remaining PDIs 80 (six shown) are inside the cuboid. Each PDI is plotted such that its vertex is at its route's parameter point for the time indicated by the selected time indicator 52. As the selected time indicator 52 changes, for example by dragging the time slider 50 forward or backwards along the time bar 40, each route's parameter points trace out a three-dimensional curve, and the vertex of the route's PDI follows this curve. In addition, each PDI has a central axis (not displayed) which passes through the PDIs vertex, and runs parallel to a tangent to this curve.

The PDIs plotted in the three-dimensional set of axes 30,32,34 are representative of the performance of the selected routes at the time indicated by selected time indicator 52 on the time bar 40. By dragging the selected time slider 50 along the time bar 40 from a first time to a second time, the position and orientation of the PDIs are updated rapidly resulting in an animated display of the motion of the PDIs for the selected routes between the first time and the second time. When the path of a PDI crosses the cuboid boundary, namely any of the cuboid's six sides, its colour changes correspondingly. Leaving the cuboid 36, a PDI changes from the first colour to the second colour. Re-entering the cuboid 36, the cone changes from the second colour to the first colour.

Preferably, each PDI is a cone having a length based upon the rate of change of the three parameters. This allows a user to easily assess the health of each route individually and in relation to one another.

Figure 4:
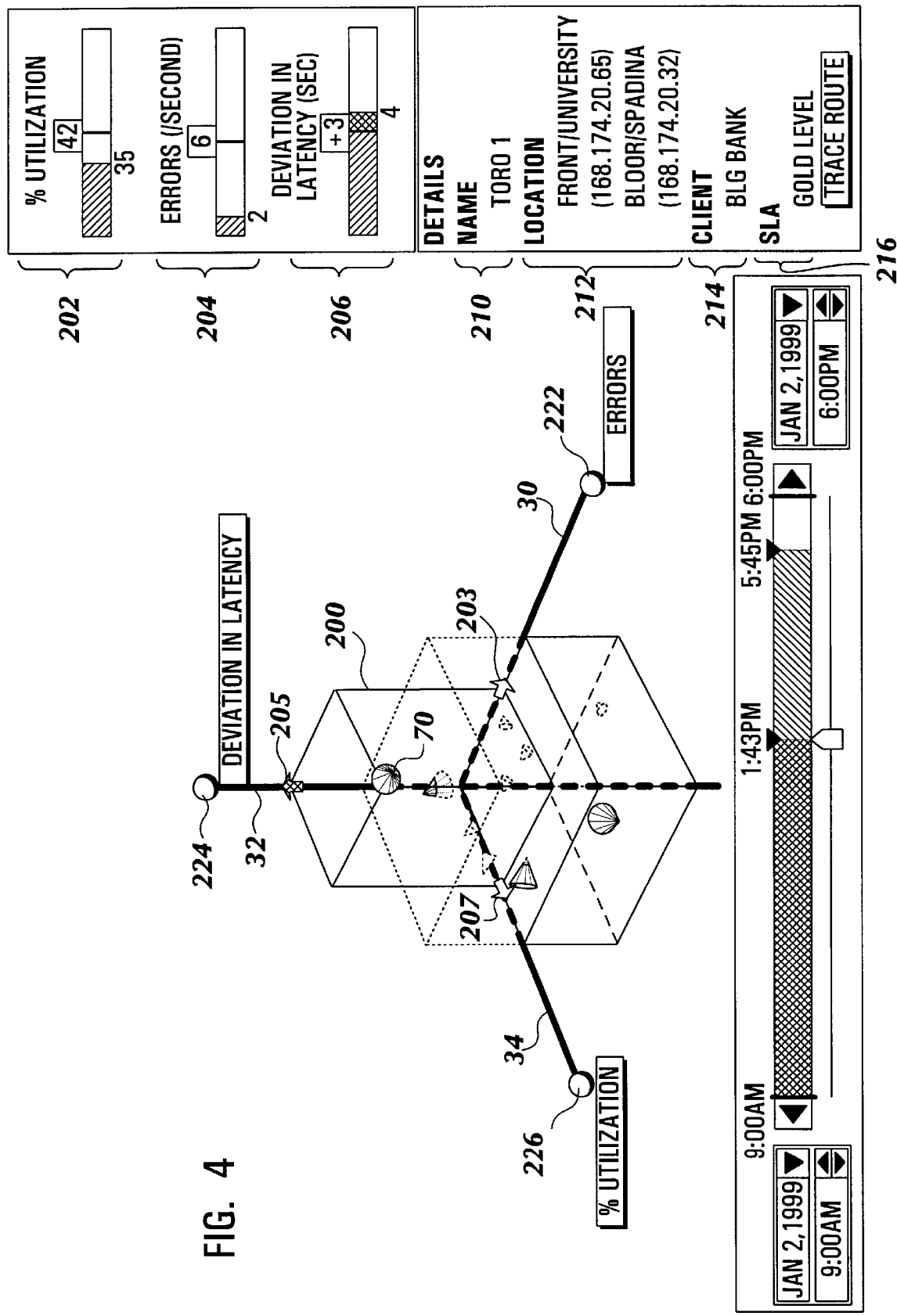
FIG. 4 is another example display in which a particular position and direction indicator has been selected.

Referring now to FIG. 4, each PDI plotted provides an access point for a user to determine further information about the underlying route. By selecting a particular PDI, for example with the mouse (23 in FIG. 1), a display such as shown in FIG. 4 is produced. In FIG. 4, PDI 70 has been selected, and a cuboid 200 having one corner at the origin of the three axes 30,32,34 and a diagonal corner to the origin at the current location of the PDI 70 is displayed allowing a visual determination of the position of the PDI with respect to the three axes 30,32,34.

The intersection of the newly displayed cuboid 200 with the three axes 30,32,34 is indicated by three indicators such as arrows 203,205,207. Preferably these indicators are displayed to indicate the parameter values of a selected PDI even in embodiments not featuring the display of cuboid 200. Preferably, these arrows are coloured to indicate whether the respective threshold has been crossed. The arrows 203,205 are displayed in the second colour indicating the respective threshold has been crossed, while the arrow 207 is displayed in the first colour indicating the respective threshold has not been crossed.

In addition, a bar graph 202,204,206 for each of the parameters is displayed. The bar graph 202 for % utilization has a line indicating the threshold value for that parameter which is "42" in the illustrated example. The bar graph 202 has a bar filled in to represent the value of the per cent utilization parameter for the selected PDI 70, in this case "35".

Preferably, the colours used in the bar graphs 202,204,206 are the same as those used in the display of the PDIS, with the first colour indicating acceptable, and the second colour indicating that the threshold has been exceeded. In the example at hand, a value of "35" for per cent utilization is less than the threshold value of "42", and the bar is shown in the first colour.

The bar graph 204 for the Errors parameter has a threshold value of "6", and a currently displayed value of "2". The bar graph 206 for the "Deviation in latency" parameter has a threshold value of "+3", and a currently displayed value of "4" which exceeds the threshold, and as such is shown in the second colour.

Below the three bar graphs 202,204,206, several details of the route corresponding to the selected PDI 70 are displayed. In the illustrated example, the route's name 210 "Toro 1", the route's location 212 as defined by its two endpoints—Front/University (168.174.20.65) Bloor/Spadina (168.174.20.32)", the route's client 214—"Big Bank", and the route's SLA (service level agreement) 216—"Gold Level" are all displayed.

Preferably, the user can select a particular orientation for the three axes 30,32,34 by dragging axis-drag-points 220, 222,224, for example with a mouse until the desired orientation is achieved. The display is continuously refreshed while this dragging is being performed to provide visual feedback to the user as to the result of the dragging. For example, referring now to FIG. 5, the display has the per cent utilization axis 34 dragged such that it and the deviation in latency axis 32 define a plane perpendicular to the display.

Figure 6:
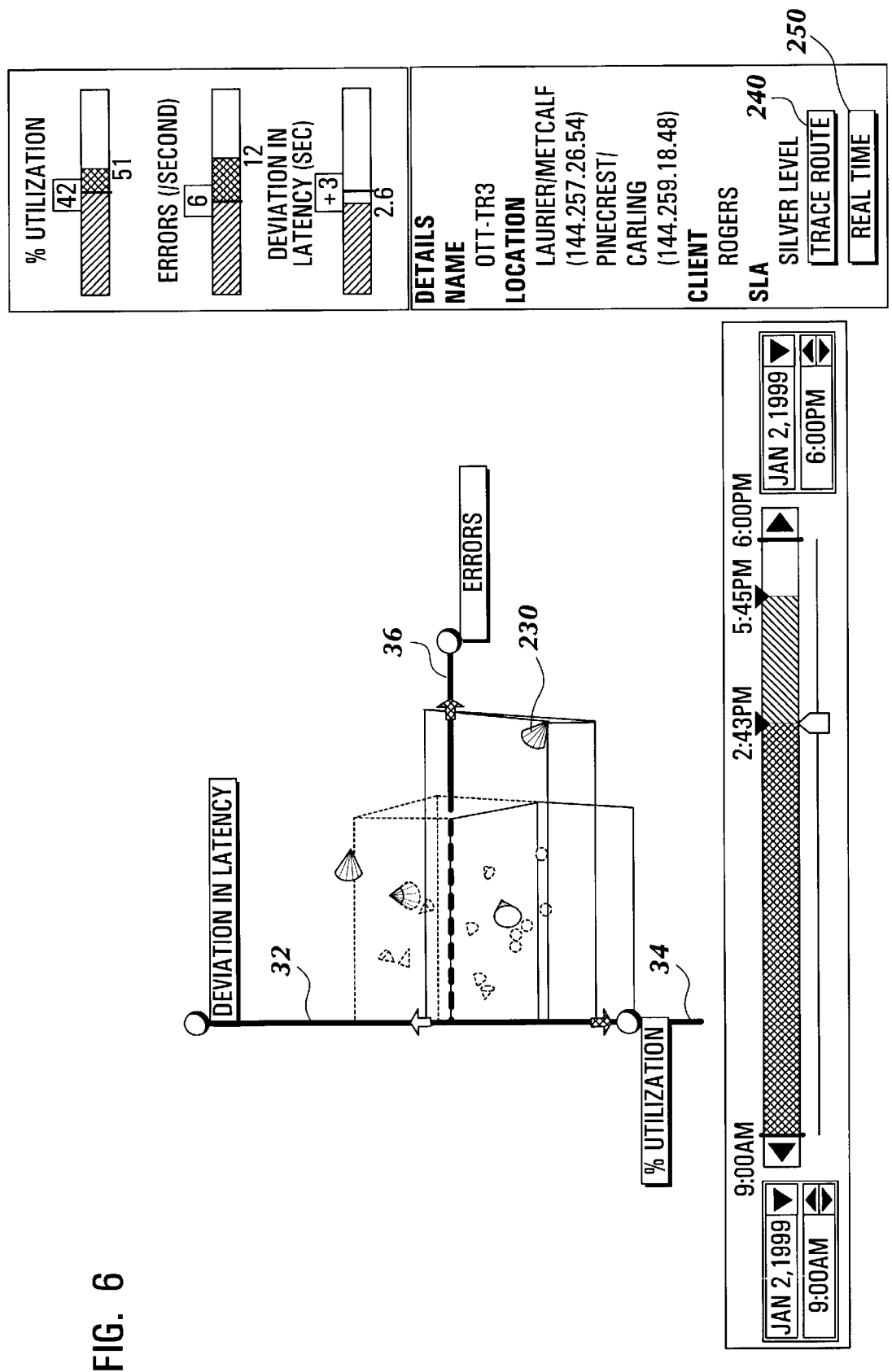
FIG. 6 is an example of the display in which the axes have been rotated and in which a particular PDI has been selected.

As shown in FIG. 6, the GUI preferably includes a "Trace Route Option" 240 screen switch which when selected launches a tool which provides more detailed information with regard to a route corresponding to a selected PDI. For example, the tool might be as taught in U.S. application Ser. No. 09/345,471 filed on the same date as this application entitled "Multi-Panel Route Monitoring Graphical User Interface, System and Method" to Suzanne Rochford et al, hereby incorporated by reference in its entirety.

Figure 5:
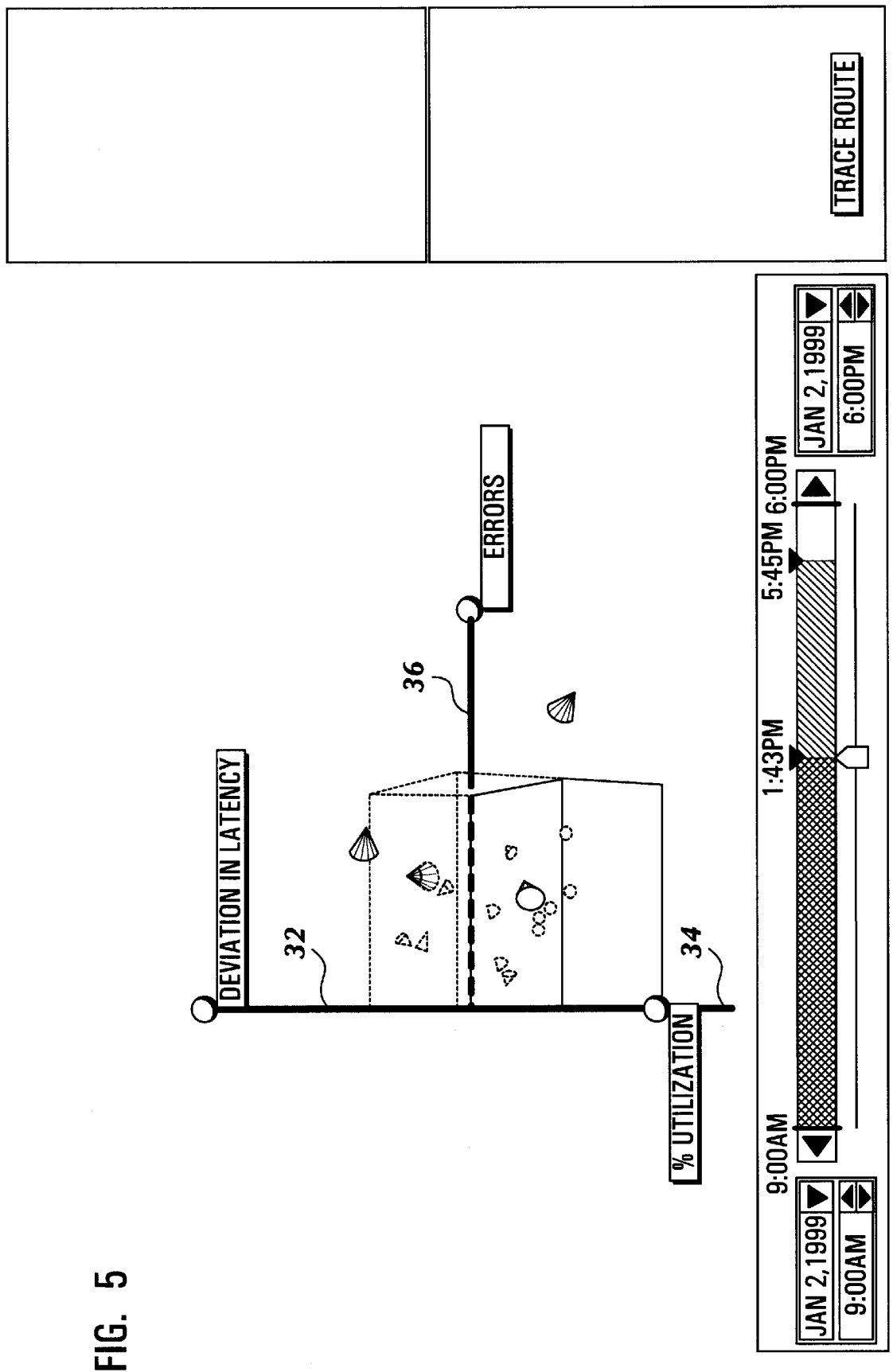
FIG. 5 is an example of a display in which the axes have been rotated.

It is noted that the PDIs are in different locations in FIG. 5 than in FIG. 4. A version of FIG. 5 with one of the PDIs selected is shown in FIG. 6 where in this case a PDI 230 for a route named "Ott-tr3" has been selected.

Flowcharts for the control of the GUI are shown in FIGS. 7A–7E. The details of a user's inputs and control over the range of the time bar have been described previously. The other possible inputs include the user selecting and dragging a display axis, the user selection of a PDI, and finally the user selecting the trace route option.

Figure 7A:
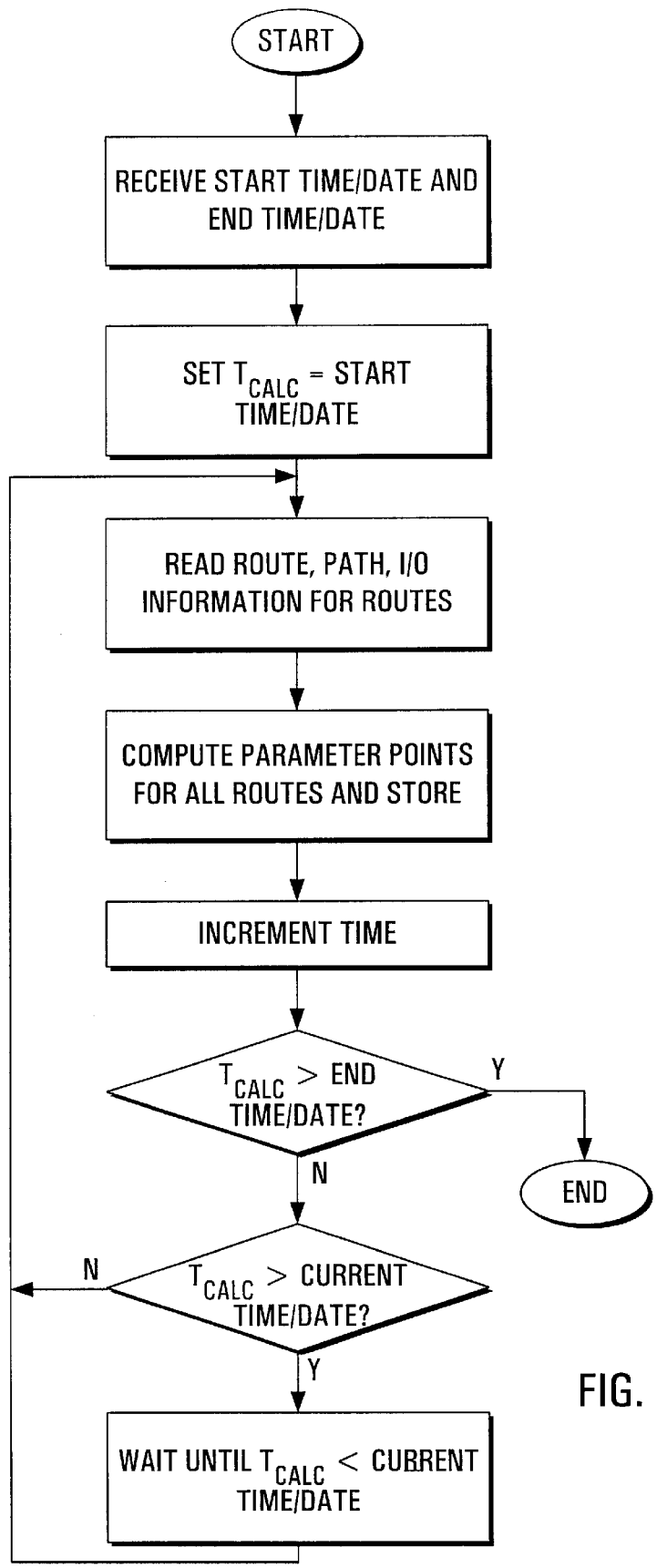
FIG. 7A is a flowchart for the calculation of information for display.

Referring firstly to FIG. 7A, this is a flowchart for how the local database of information used by the GUI is maintained. The process is run continuously so long as there is not a complete set of data for display for the selected time period. To begin, before any processing is done a user inputs a start/time date and an end time/date. Also, although not shown, it is assumed that at some point a group of routes to be considered has been selected. Alternatively, all routes in the system could be selected by default.

Next, the time of calculation, $T_{calc}$ is set to equal the start time and date. Now the route, path and I/O information is read for all of the selected routes from the database 12. For each of the routes the parameter points and related information are computed as described below and stored in the local database 29. Next, the time $T_{calc}$ is incremented. If a time is greater than the end time date, then the calculation is finished. Furthermore, if the time $T_{calc}$ is greater than the current time then there would be no further information to process. As such, the system is preferably designed to wait until the time $T_{calc}$ is less than the current time at which point there would be further information to process.

Thus the flowchart of FIG. 7A covers two situations. Firstly, the start and end time/dates may be both in the past in which case all of the information needed to compute all of the parameter points for all of the times of interest is already available, and as such no waiting needs to be done, but rather a complete local database can be created for the selected time. Alternatively, if the current time is earlier than the end date/time then the parameter points can only be computed from the start time up until the current time. Then the database is maintained in real-time to include all of the most current data.

Figure 7B:
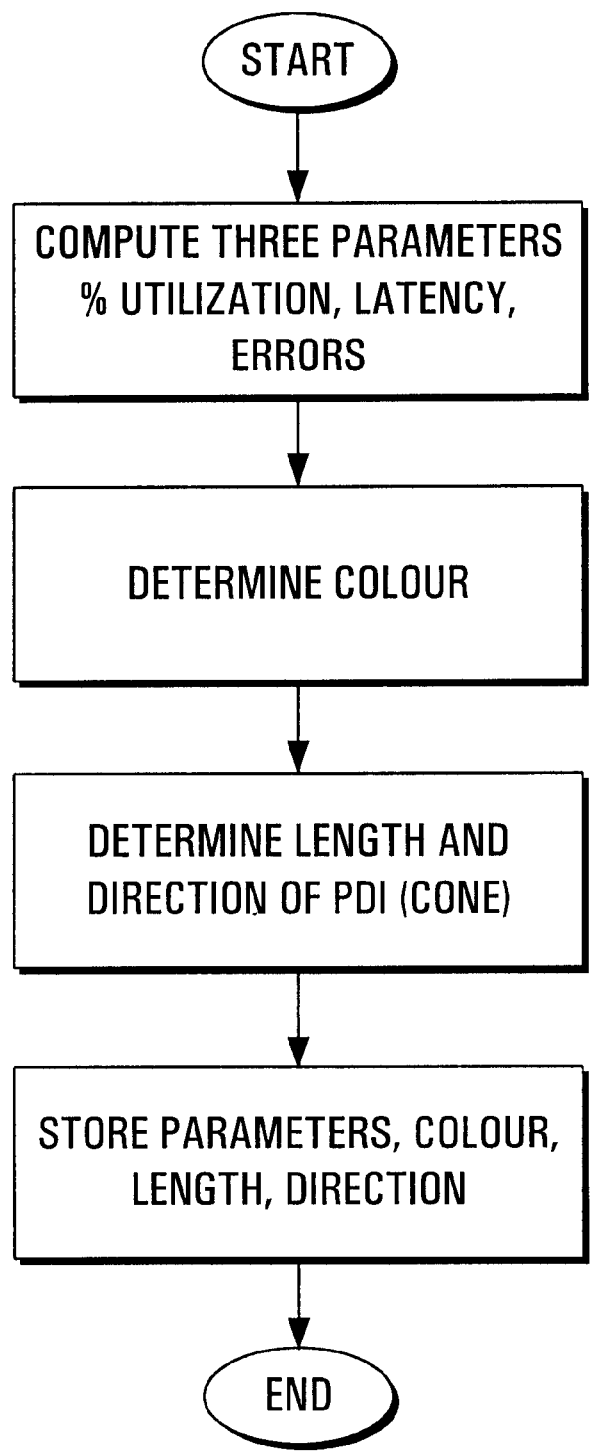
FIG. 7B is a flowchart for the calculation of parameters at a particular point in time.

Referring now to FIG. 7B, the steps taken to compute the parameters will be described. Firstly, the three parameters per cent utilization, deviation in latency, errors are computed as a function of time and the information stored in the database.

Deviation in latency for a given route may be computed according to deviation in $\Delta$(destination time—source time)/$\Delta t$. The parameter may be determined by examining deviation in latency information for the paths and I/Os used by a route, and converting this to a useful measurement of deviation in latency for the entire route.

The parameter % utilization may be determined by examining utilization information for the paths and I/Os and converting this to a useful measurement of % utilization for an entire route. For example, a utilization value for the busiest link/interface used in a given route may be taken as the route's % utilization.

The parameter errors is determined by examining error information for the paths and I/Os of a given route and converting these to a useful measurement of errors for the entire route. For example, errors could simply be computed by adding up all the packets received in error and all the lost packets from the source to the destination for the route.

Next, based on the three parameters calculated, the colour of the corresponding PDI, when displayed, is determined. If any of the thresholds associated with the three parameters have been crossed then the colour is set to be the second colour, whereas otherwise is selected to be the first colour. Next, preferably the length of the PDI is determined as a function of the rate of change of the three parameters. Next, the direction, or central axis, of the PDI is determined. Finally, the computed parameters, the colour, the-length, and the direction are all stored in the local database 29 in association with the time of calculation $T_{calc}$.

Figure 7C:
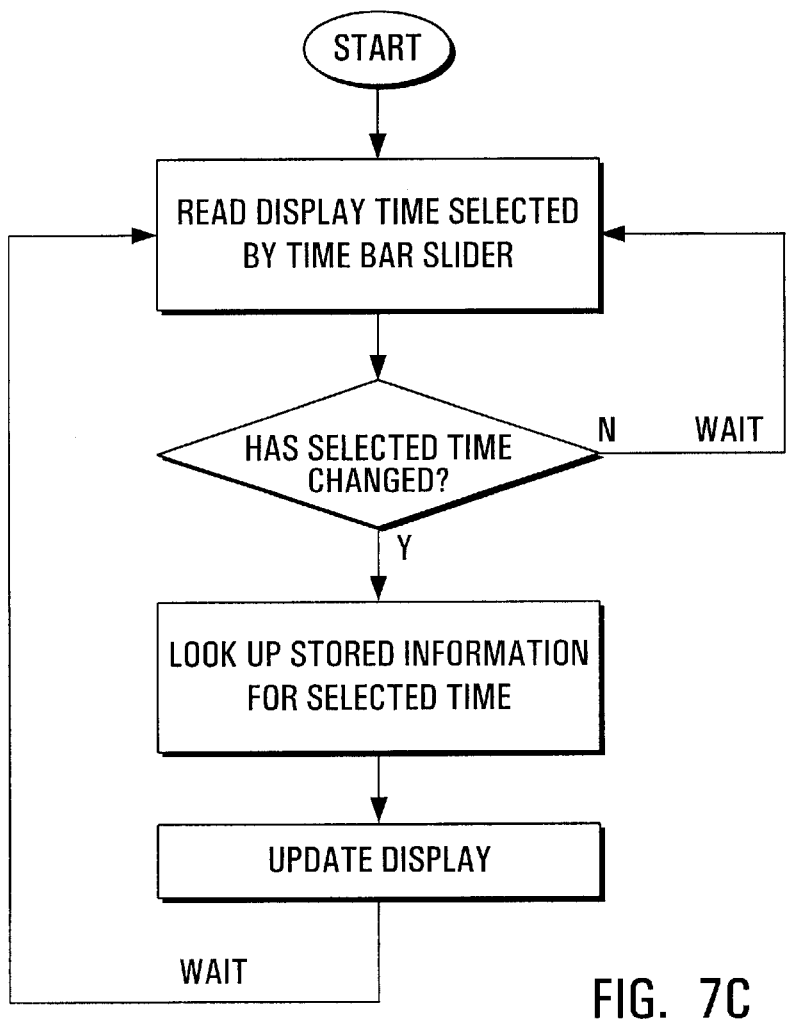
FIG. 7C is a flowchart for how the display is updated when archival data is being used.

Turning now to FIG. 7C, the update of the display for archival data will be described. The particular point in time for which data is to be displayed in the three dimensional graph is indicated by the selected time indicator and the time bar slider (52,50 in FIG. 3). The first step is to read the time indicator. If the selected time has not changed then there is no need to update the display. Alternatively, if the selected time has changed, then the stored information as computed previously for that time is looked up in the local database. Next, the display is updated as a function of the read information. An animated display will result from a user dragging the selected time between a first and second time. Preferably, an input mechanism is provided by which a user can also select that an animated display be produced for time starting at a first selected time progressing forward. In this event, the display is then updated continuously by reading data from the local database for sequential values of time starting at the first selected time.

Figure 7D:
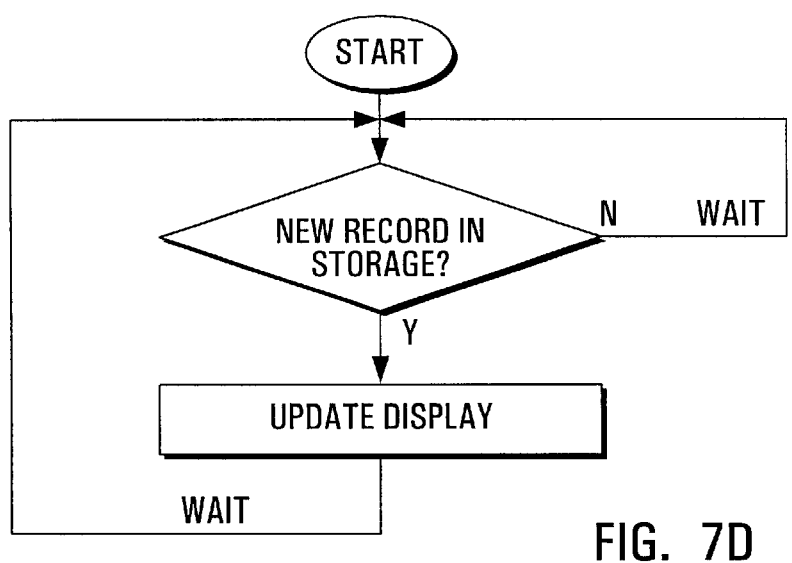
FIG. 7D is a flowchart for how the display is updated when real-time data is being used.

FIG. 7D is a flowchart for the update of the display for real-time data. A user might select this type of display by dragging the time slider 50 such that it is at the current time. Alternatively, preferably a "real-time update" (or auto-refresh) option is selectable, for example by means of a screen selectable button 250 shown in FIG. 6. In this case, it is assumed that the current display is displaying the most recently calculated information. The process consists of waiting for a new record to be written into storage in the local database 29 at which point the display is updated to display this new information. This pattern of waiting and then reading is done repeatedly.

Figure 7E:
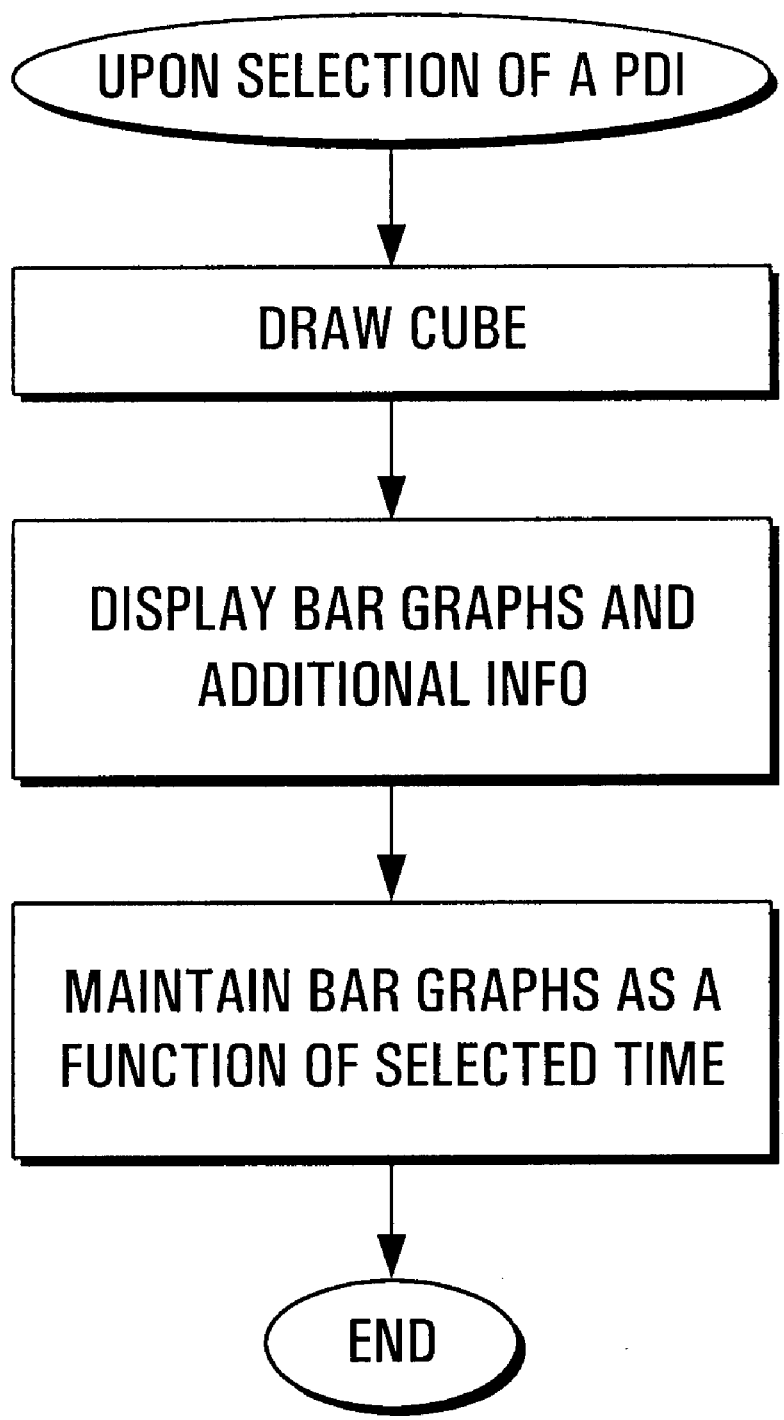
FIG. 7E is a flowchart for how the display is updated after a particular PDI has been selected.

Turning now to FIG. 7E, the steps executed to produce the more complete display of FIG. 4 will be described. The starting point for this display is the selection of a PDI, for example with a mouse. After a PDI is selected, a cuboid is drawn as described above for that PDI. Furthermore, the bar graphs and additional information are displayed on the right portion of the GUI. Next, the bar graph and three dimensional display are both updated as a function of the selected time.

The above described example has focused on a situation in which device-level status and performance information has been collected from a network, for example using the method taught by the above identified Robinson et al reference. It is to be understood that other suitable network management interface devices may be employed to this end. The device-level status and performance information is transformed into path and route information by the method taught by Robinson et al although other methods of doing this may alternatively be used. What is important is that the information collected from the network is somehow transformed into information respecting each of a series of routes of interest. It is to be understood that the steps of collecting device-level status and performance information from the network and transforming the device-level status and performance information into path and route information may be implemented as part of an embodiment of this invention. Moreover, in the preferred embodiment described above, a 3-D route monitoring GUI is provided for displaying three parameters for various routes graphically. In a more general embodiment, these parameters can be displayed graphically in any appropriate way which allows an operator to obtain an understanding of certain characteristics of all of the routes in which he/she is interested by inspecting the graphi-cal display. Preferably, a single graphical display element is used to function as each parameter point.

In the illustrated embodiments, there are three parameters of interest. More generally, there may be N parameters of interest for each route. Any suitable graphical representation of these parameters with a single parameter point for each route may be employed. For example, if there are only two parameters of interest, then a 2-dimensional plot may be used to display the parameter points. Preferably, if there are more than three parameters of interest, these are converted such that there are only three. Additional dimensions (beyond three) may be implemented by imparting other visually discernable characteristics to the parameter point, such as varying width, varying shape etc.

In the preferred embodiments, a cone is used to provide position and direction indication. More generally any type of position and direction indicator displayed in a manner from which the instantaneous direction of the parameter point can be visually ascertained may be used. Similarly, the length of the cone has been used to indicate the rate of change of the parameter point in the above described preferred embodiment. More generally, any visual feature which is correlatable with the rate of change of the corresponding parameter point may be used.

The above described embodiments have focused mainly on a method in a computer system for displaying route parameters. In addition, an embodiment of the invention also provides for a software program containing software which when run will implement one or more of the above discussed methods, stored on a computer readable medium. Another embodiment of the invention provides a computer system per se adapted to implement one or more of the above discussed methods. Furthermore, in another embodiment, a graphical user interface is provided which has been adapted to implement one or more of the above discussed methods.

Numerous modifications and variations of the present invention are possible in light of the above teachings. It is therefore to be understood that within the scope of the appended claims, the invention may be practised otherwise than as specifically described herein.

For example, the described embodiments have been limited to displaying archival or real-time data. Preferably, a predictor is provided which is, on the basis of archival and current data, capable of calculating estimated data for future times which is then available for display.

We claim:

1. A network management method for managing a network comprising:

collecting device-level information from the network;

transforming the device-level information into route information for each of a plurality of routes in the network, each route from a respective first endpoint and a respective second endpoint, and into path information for each path of a respective plurality of paths taken through the network for each route;

computing, from the path and route information, parameters which characterize the state of each of the plurality of routes: and displaying the parameters of each of the plurality of routes graphically.

2. A method according to claim 1 wherein displaying the parameters of each of the plurality of routes graphically comprises displaying a parameter point in the form of a single graphical display element for each route.

3. A method according to claim 1 wherein displaying the parameters of each of the plurality of routes graphically comprises:

displaying a 3-D representation of three axes, each axis pertaining to a respective one of three route parameters;

displaying for each of the plurality of routes a parameter point at a point in the 3-D representation corresponding to the route's parameters as a function of time.

4. A method according to claim 1 wherein displaying the parameters of each of the plurality of routes graphically comprises displaying them in a manner from which the instantaneous rate of change of the parameters can be visually ascertained.

5. A method according to claim 4 wherein each position and direction indicator is a cone which has a central axis pointing in the instantaneous direction of the parameter point and which has a length which is proportional to the rate of change of the corresponding parameter point.

6. A method according to claim 3 further comprising:

upon receiving a particular input from a user selecting a particular parameter point, displaying further details in relation to the corresponding route.

7. A method according to claim 6 further comprising:

displaying a cuboid with one corner at the origin of the three axis and with a corner diagonal to the origin at the location of the particular parameter point.

8. A method according to claim 1 further comprising:

determining for each of the parameters whether they are within a respective acceptable operating range or are outside their respective acceptable operating range;

wherein displaying the parameters of each of the plurality of routes graphically comprises displaying a parameter point with a first characteristic if none of the parameters are outside their respective acceptable operating range, and displaying the parameter point with a second characteristic if at least one of the parameters are outside their respective acceptable operating range.

9. A method according to claim 3 further comprising:

displaying a selected time indicator indicating a time for which parameters are being displayed;

upon receipt of a particular input from a user revising the selected time indicator to indicate a different time, updating the display to show the parameters for the revised selected time.

10. A method according to claim 3 further comprising producing an animated display by refreshing the display repeatedly for parameters for the routes for times between a first time and a second time.

11. A network management system comprising:

a network management interface device operable to collect device-level status and performance information from a network;

one or more processing devices operable to transform the device-level status and performance information into route information for each of a plurality of routes in the network, each route from a respective first endpoint and a respective second endpoint, and into path information for each path of a respective plurality of paths taken through the network for each route and to compute from the path and route information parameters which characterize the state of each of the plurality of routes; and a graphical user interface operable to display the parameters of each of the plurality of routes graphically.

12. A method according to claim 3 further comprising:

determining an instantaneous direction of motion of each parameter point as a function of time;

wherein displaying a parameter point comprises displaying a position and direction indicator in a manner from which the instantaneous direction of the parameter point can be visually ascertained.

13. A method according to claim 3 further comprising:

determining a rate of change of the parameter point;

wherein each position and direction indicator has a visual feature which is correlatable with the rate of change of the corresponding parameter point.

14. A method according to claim 13 wherein each position and direction indicator is a cone which has a central axis pointing in the instantaneous direction of the parameter point and which has a length which is proportional to the rate of change of the corresponding parameter point.

15. A method according to claim 6 wherein the further details comprise the three parameters for the particular route displayed individually.

16. A method according to claim 15 further comprising:

displaying a cuboid with one corner at the origin of the three axis and with a corner diagonal to the origin at the location of the parameter point.

17. A method according to claim 15 further comprising displaying markers on each of the three axes indicating the values for the selected parameter point.

18. A method according to claim 8 wherein said first and second characteristics are different colours.

19. A method according to claim 3 further comprising:

upon receipt of a particular input from an operator revising the orientation of the display of the three axes.

20. A method according to claim 10 wherein the advancement of the first time to the second time is controlled by dragging a selected time indicator between the first time and the second time on a time bar.

21. A method according to claim 12 further comprising updating the display in real-time to reflect a most recent set of parameters.

22. A method according to claim 12 further comprising displaying a cuboid having an interior within which all parameter points represent acceptable values, and having an exterior within which at least one parameter point is outside an acceptable range.

23. A method according to claim 12 further comprising estimating future parameters from archival parameters and current parameters and making these future times available for selection of display.

24. A computer system adapted to implement the method of claim 1.

25. A graphical user interface adapted to implement the method of claim 1.

26. A computer readable medium having software stored thereon for instructing a computer to implement a method according to claim 1.

27. A computer system adapted to implement the method of claim 3.

28. A graphical user interface adapted to implement the method of claim 3.

29. A computer readable medium having software stored thereon for instructing a computer to implement a method according to claim 3.

* * * * *